July 3, 1951            R. W. HEWES            2,559,429

FLIGHT PROGRESS BOARD

Filed April 13, 1950            3 Sheets—Sheet 1

Inventor
R. W. Hewes,
By Neil A. Preston.
his Attorney

July 3, 1951
R. W. HEWES
2,559,429
FLIGHT PROGRESS BOARD
Filed April 13, 1950
3 Sheets-Sheet 2
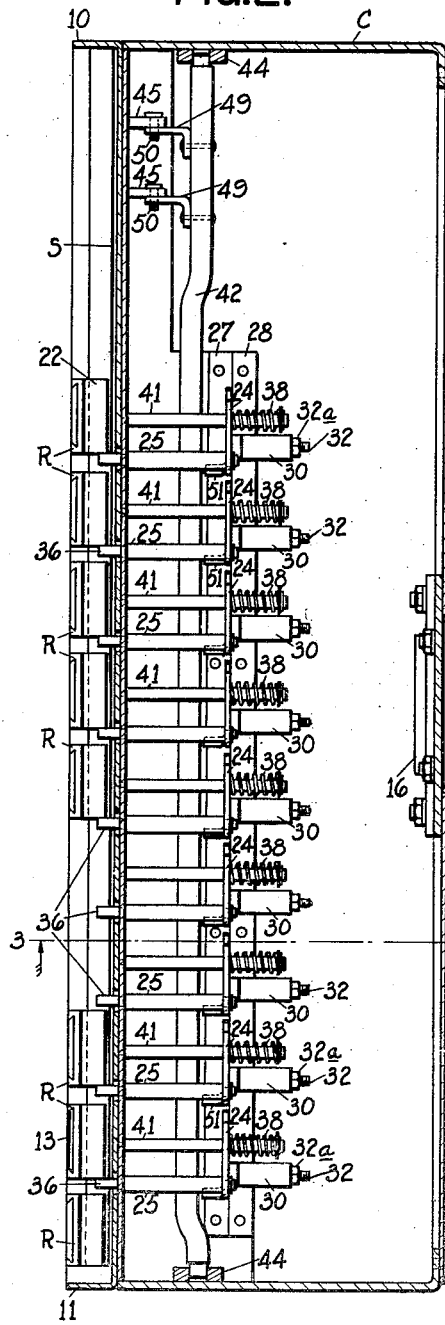
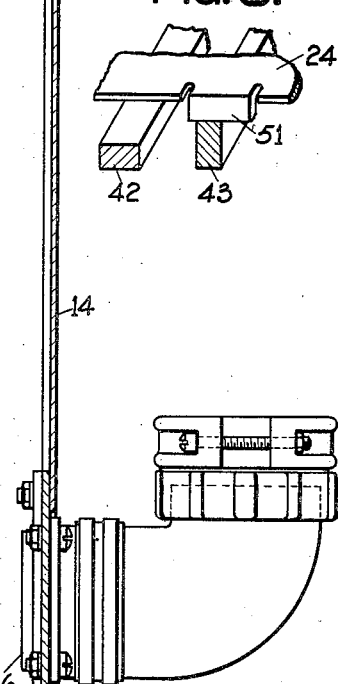
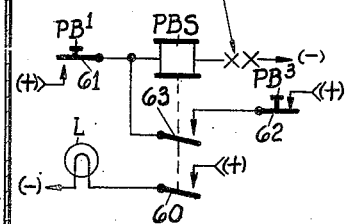
Fig. 7. INTERLOCKING CONTACTS OF OTHER FLIGHT PROGRESS BOARDS
Inventor
R. W. Hewes,
Neil W. Preston,
his Attorney July 3, 1951 R. W. HEWES 2,559,429
FLIGHT PROGRESS BOARD
Filed April 13, 1950 3 Sheets-Sheet 3
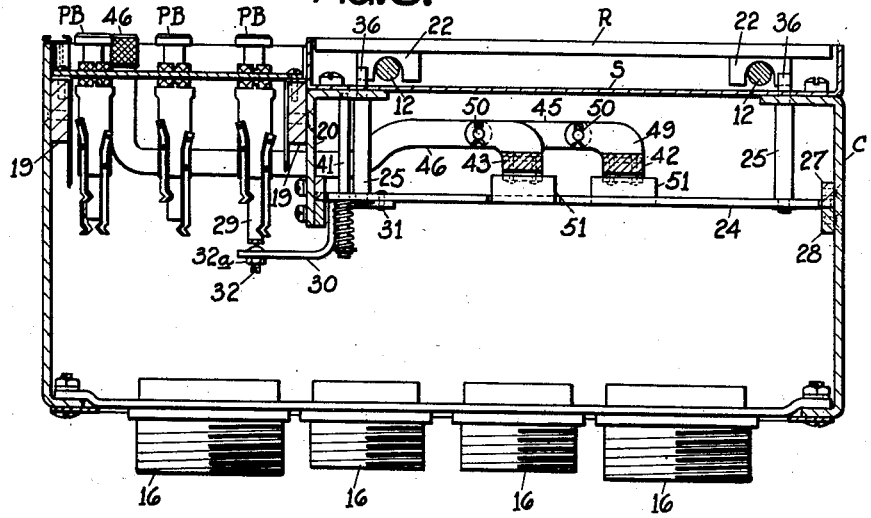
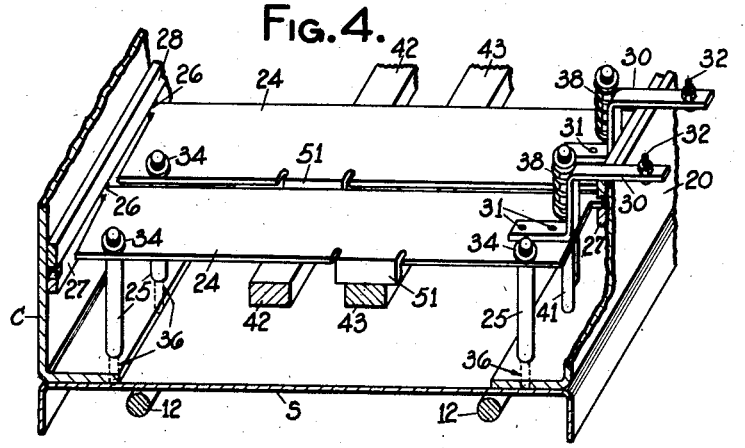
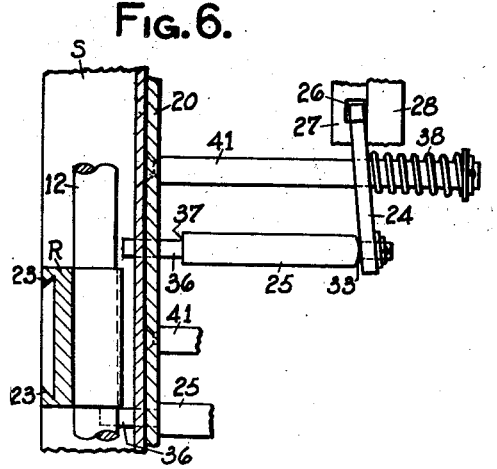
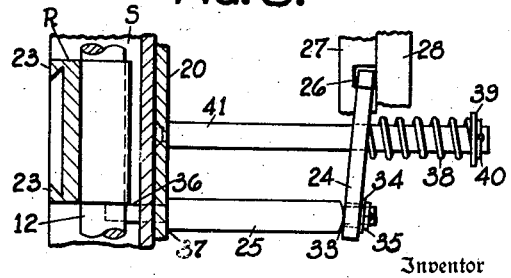
Inventor
R. W. Hewes,
Neil W. Polston,
his Attorney Patented July 3, 1951

2,559,429

UNITED STATES PATENT OFFICE 2,559,429

FLIGHT PROGRESS BOARD

Ralph W. Hewes, Rochester, N. Y., assignor to General Railway Signal Company, Rochester, N. Y.

Application April 13, 1950, Serial No. 155,639

8 Claims. (Cl. 177—311)

This invention relates to flight progress boards for facilitating the governing of airplane traffic, and it more particularly pertains to means for facilitating the governing of air planes as they are laddered down and corresponding manual designations are made on such boards.

The governing of air traffic by an airways or airport approach control system is generally accomplished by the aid of a flight progress board which has strip holders, or receptacles, for flight progress strips, stacked one above the other, one strip receptacle being provided for each flight altitude at a particular fix along an airway, or holding stack in approach to an airport. One flight progress strip is inserted in each receptacle for identifying the airplane flight assigned to that particular flight altitude. These flight progress strip receptacles are generally stacked one above the other on an inclined board and are maintained in alignment by inclined guide rods so that as airplanes are laddered down through the respective flight altitudes and the lower altitude becomes vacated, the removal of the receptacle for the lowest flight altitude causes the receptacles for the higher flight altitudes to slide down and occupy positions vacated as a result of the laddering down operation.

In addition to the use of flight progress strips for keeping track of airplane flights assigned to respective flight altitudes, a panel of indicators and push buttons for the respective flight altitudes may be provided for a particular fix or holding stack as is disclosed, for example, in the prior application of N. B. Coley, Ser. No. 93,900, filed May 18, 1949, now abandoned, where clearance and occupancy indicator lamps are provided on a panel at positions comparable to the respective flight altitudes of a fix or holding stack together with push buttons for clearance and flight cancellation purposes. In an organization of this kind, the cancellation of a particular flight as an airplane descends to the next lower flight altitude, calls for the flight progress strip associated with that flight altitude to be correspondingly moved to the next lower position. It is further desirable that the flight progress strips, under conditions where the above described means for designation of clearances and cancellation is in use, be moved down individually and in synchronism with the cancellation of the associated clearance indications. At other times, however, when the actuation of the respective clearance and cancellation buttons is made for keeping track of respective clearances and cancellations for only a certain group of flight altitudes, it is desirable that the flight progress strip receptacles for the other flight altitudes be adapted so that they are free to drop simultaneously upon the removal of a lower receptacle, irrespective of cancellation button actuation.

An object of the present invention is to provide a flight progress board wherein the designation of a cancellation control for any particular flight altitude drops the associated flight progress strip receptacle to the next lower flight altitude position without disturbing the disposition of any other flight progress strip receptacle for the associated particular fix or stack.

Another object of the present invention is to provide means for dropping a flight progress receptacle without disturbing the disposition of other receptacles to the next lower flight altitude position in response to the actuation of a button for cancellation of a clearance indication.

Another object of the present invention is to provide manually operable means for selectively rendering a group of flight progress strip receptacles either responsive or non-responsive to the actuation of cancellation buttons for the associated flight altitudes.

Other objects, purposes, and characteristic features of the present invention will be in part obvious from the accompanying drawings and in part pointed out as the description progresses.

In describing the invention in detail, reference is made to the accompanying drawings in which similar reference characters are used to designate similar and corresponding parts, and in which:

Fig. 2 is a side elevational view of the flight progress board shown in Fig. 1 shown partly in cross section;

Fig. 3 is a sectional view of the flight progress board shown in Fig. 2 taken along the section line 3—3 of Fig. 2;

Fig. 4 is a view in perspective, and with some parts shown in cross section, of a section of the flight progress board of Fig. 1 particularly illustrating the structure of flight progress strip receptacle release mechanism;

Fig. 5 is a fragmentary elevational view, shown partly in cross section, of the release mechanism in its engaging position;

Fig. 6 is a fragmentary view of the release mechanism, shown partly in cross section, illustrating the position the mechanism assumes in its release actuated condition;

Fig. 7 illustrates diagrammatically a simplified control circuit for the control of an indicator lamp by respective reservation and cancellation indication control buttons; and Fig. 8 is a fragmentary view of the release mechanism, shown partly in cross section, illustrating the mechanism in its actuated position when tripped by a group actuating cam.

Figure 1:
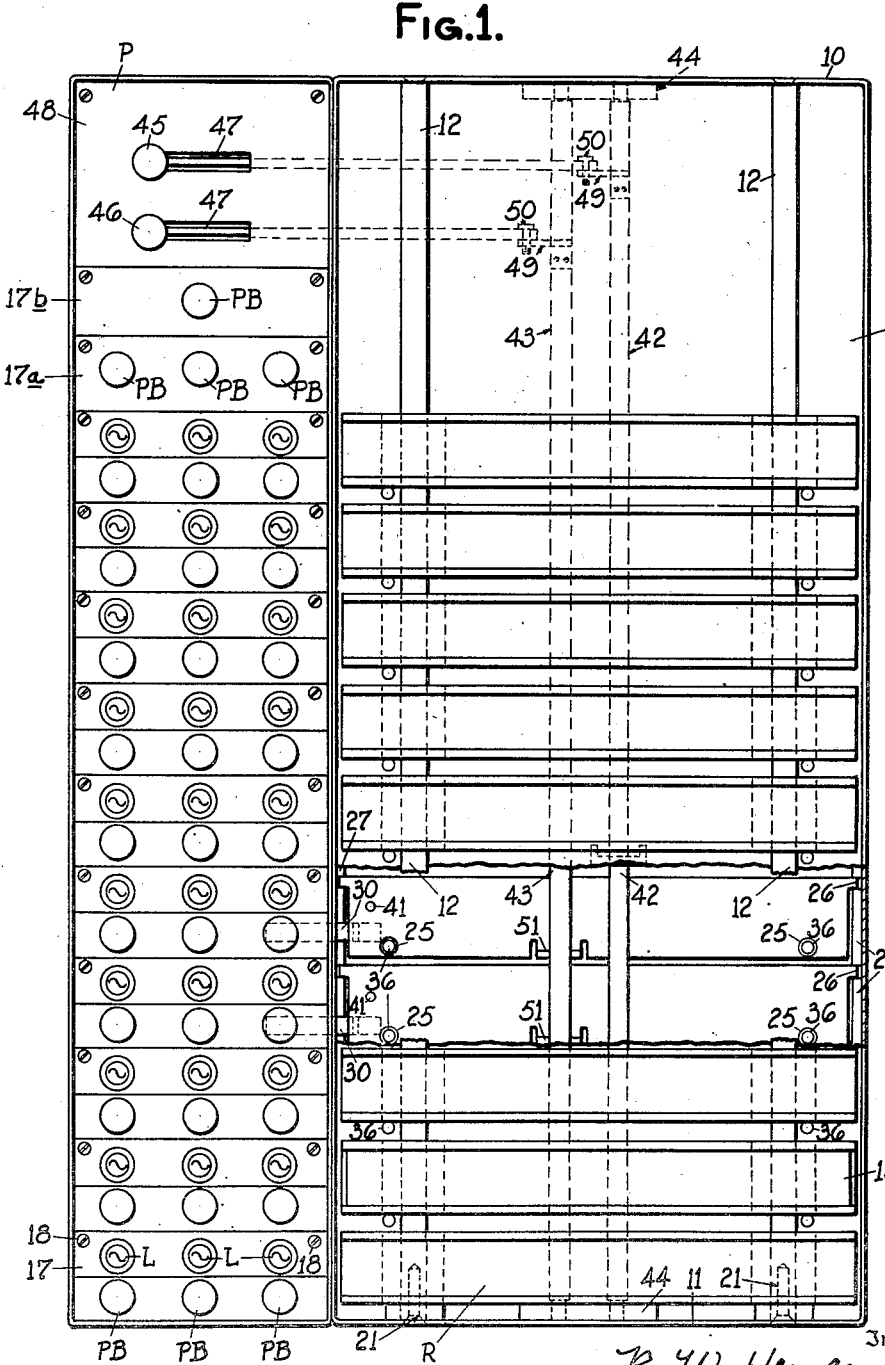
Fig. 1 is a front elevational view of a flight progress board provided according to the present invention.

In general the flight progress board provided according to the present invention comprising a sheet metal case C, a control panel P on the front of the case (see Fig. 1), and a flight progress board section for a particular fix having a supporting plate S for supporting by outwardly extending upper and lower flanges 10 and 11 respectively, left and right guide rods 12 for flight progress strip receptacles R. These receptacles R are adapted to hold flight progress strips such as the flight progress strip 13 for the airplane flights assigned to the respective flight altitudes for the particular fix with which the flight progress board illustrated is associated.

Although the flight progress board as provided by the present invention is preferably disposed in an inclined position as has been heretofore described, for the purpose of facilitating the description and simplifying the drawings, no account has been taken as to its angle of disposition. For convenience in describing this embodiment of the present invention as illustrated in the drawings, reference will be made from time to time to the board as if it were disposed directly upright as viewed in Fig. 1, thus reference to vertical and right-hand and left-hand directions will be considered as applied to Fig. 1, or the side elevational view of Fig. 2 unless otherwise specified. If the board were to be actually used in this vertically disposed position, there would necessarily be means provided for preventing the receptacles R from falling forward from the board, these receptacles being held only by gravity as shown against the guide rods 12 when the board is in operation in its inclined position.

A back plate 14 (see Fig. 2) is secured to the case C by the screws 15 so as to be readily removable for purposes of facilitating the wiring of the panel P. The back plate 14 provides support for a number of quickly detachable connecters 16 so that wiring connections from the panel P which are required to extend out of the case C are connected to the respective connecters 16, thus providing a convenient means for the coupling of the wires of the panel P to wires extending to other control units (not shown), such as relay cabinets and the like, upon installation of the flight progress board in operating position in coordination with other equipment as has been illustrated in the above mentioned application of N. B. Coley, Ser. No. 93,900, filed May 18, 1949, and in the application of N. B. Coley, filed of even date with the present application, Serial No. 155,720, filed April 13, 1950.

The panel P comprises an individual push button plate 17 for each flight altitude, this plate 17 being suitably secured, as by the screws 18, to suitable brackets 19 (see Fig. 3) so that the plates 17 may be removed individually to facilitate the attachment of wires, inspection of wires and contacts, and the replacement of indicator lamps, in accordance with the requirements of practice, without disturbing the apparatus provided for other flight altitudes. The left-hand bracket 19, as viewed in Fig. 3 is secured to the left-hand side of the case C, while the right-hand bracket 19 is secured to another bracket 20, which in turn is secured to the case C.

The plate 17 for each flight altitude has secured thereto three push buttons PB in a horizontal row, and three indicator lamps L in a row above the respective push buttons PB. These different push buttons PB and lamps L for each flight altitude are employed for distinctive air traffic control purposes, such as for reservation, transfer of authority, and cancellation purposes as specifically described in the above mentioned applications of N. B. Coley. The push buttons PB have electrical contacts effective through circuits including a code communication system to govern energization of the indicator lamps L.

Above the buttons and indicator lamps for the respective flight altitudes, is a plate 17a (see Fig. 1) which is provided for mounting three push buttons PB without associated indicator lamps, these push buttons being employed, as is described in the above mentioned application of N. B. Coley filed of even date with this application, for the purpose of testing the respective three vertical rows of indicator lamps L on the panel P. Directly above the plate 17a is a mounting plate 17b which has a single push button PB contained therein which may be used, according to the above mentioned Coley application as a cancellation push button.

The vertical guide rods 12 are suitably secured to the flanges 10 and 11 of the supporting plate S as by the screws 21. These rods are preferably round as illustrated for cooperating with circular channels formed in bosses 22 (see Fig. 3) on the back of each of the receptacles R and spaced from each other comparable to the spacing of the guide rods 12. Thus when the flight progress board is disposed in its operating position, and is inclined at a suitable angle for convenience of reach of an operator, it is at an angle suitable to cause the receptacles R to slide freely by gravity down the guide and supporting rods 12 on which they rest. Each of the receptacles R is formed with upper and lower extending lips 23 (see Figs. 5 and 6) as a means for receiving a flight progress strip when it is slipped into the face of the receptacle R from one side.

Disposed behind each of the receptacles R is a trip plate 24 which when actuated withdraws an associated pair of trip pins, or rods, 25 (see Figs. 5 and 6) to permit the dropping of the receptacle R for the associated flight altitude. Each trip plate 24 is pivoted at its upper edge by reason of detents 26 (see Fig. 4) extending from the ends thereof and being journaled between a front rod 27 which is notched for receiving the respective detents 26 and a straight back rod 28. These respective pairs of rods 27 and 28 are secured in a position extending vertically as viewed in Fig. 2 along one side of the case C and along the bracket 20 respectively at the ends of the trip plates 24. Thus each of the plates 24 is pivoted at its upper edge so that it can be actuated to a limited extent about this pivot point. Actuation of the plates 24 is accomplished by the depression of the right-hand push button PB (see Figs. 1 and 3) for the associated flight altitude, such push button PB having a plunger 29.

Each plunger 29 (see Fig. 3) is operatively connected with a bracket 30, which in turn is suitably secured as by the rivets 31 to the trip plate 24 for the associated flight altitude. An operating connection is made to each bracket 30 by a round headed adjustment screw 32 threaded into a hole in the bracket 30, with the head end of the screw bearing against the end of the plunger 29 for the associated flight altitude. The rotation of the adjustment screw 32 is accomplished by engagement in a screw driver slot formed in the backwardly extending end thereof. It is preferable that adjustment be made so that the tripping of the associated receptacle R and the actuation of the electrical contacts on the associated button takes place substantially at the same time so that one cannot be actuated without the other. The screw 32 is retained in its adjusted position by a lock nut 32a. It is thus provided whenever a cancellation push button PB is depressed and its contacts are actuated, its plunger 29 is effective to actuate the trip plate 24 for that flight altitude in a direction to withdraw the associated trip pins 25 from beneath the flight strip receptacle R for that flight altitude so as to cause that receptacle to be dropped to the position for the next lower flight altitude.

As viewed in Fig. 4, the respective left and right trip pins 25 are provided for each trip plate 24 so as to provide a support for the flight strip receptacle R for that flight altitude at a position close to each end of that receptacle. As viewed in Fig. 5, each of the pins 25 has a shoulder 33 which bears against the associated trip plate 24. The right-hand end of the trip pin 25 as viewed in Fig. 5 is fitted loosely through a hole in the trip plate 24 and is operatively secured to the trip plate 24 by reason of a washer 34 and a split ring 35 which is assembled to the right-hand end of the trip pin 25 behind a suitable shoulder near the end of the pin. Because of the operation of the trip plate 24 being about a pivot point, while the movement of the trip pin is longitudinal, the opening in the plate 24 for the passage of the right-hand end of each pin 25 is large to permit angular movement as required between the pin 25 and the plate 24, and the shoulder 33 is preferably formed with slightly curved edges as is illustrated in Fig. 5 to facilitate this angular movement.

The left-hand end 36 of each of the pins 25 extends through a suitable opening in the supporting plate S, and each pin 25 is normally biased to a position extending through the plate S to an extent limited by a shoulder 37 by reason of a compression spring 38 near the right-hand end of each trip plate 24 as veiwed in Fig. 4. These springs 38 are maintained under compression between the back side of the respective trip plates 24 and washers 39 (see Figs. 5 and 6) which in turn are retained by suitable split rings 40 which engage suitable slots or shoulders at the right-hand ends (see Fig. 5) of supporting pins 41. These supporting pins 41 are suitably secured at their left-hand ends, as viewed in Figs. 5 and 6, as by being riveted to the supporting bracket 20, extending from the back side of that bracket 20 and through openings in the respective trip plates 24. In this way the trip plates 24 are biased for clockwise rotation as viewed in Fig. 5 about their pivot points at the upper edges thereof, and are actuated in this direction normally to an extent limited by the shoulders 37 of the trip pins 25.

Because of it being desirable, as has been heretofore pointed out in general, to render the trip pins ineffective selectively for respective upper and lower groups of flight altitudes, the respective right and left upper and lower group restoration rods 42 and 43 (see Fig. 1) are provided extending vertically substantially at the center of the supporting plate S, and spaced a short distance in front of the trip plates 24. These rods are journaled in suitable bearing plates 44, which are in turn secured to the respective upper and lower sides of the case C. These rods 42 and 43 are preferably of rectangular or square shape as is illustarted in Fig. 4 except for the cylindrical ends thereof, which are journaled in the bearings 44. It is also desirable that the rods 42 and 43 be offset to a limited extent as is ilustrated in Fig. 2 for the portion of the rods extending in front of the trip plates 24 for the respective flight altitudes. The reason for this offset portion will be more readily apparent when the mode of operation of the flight progress board is hereinafter considered.

Rotation of the group restoration rods 42 and 43 is accomplished by respective levers 45 and 46 which extend through respective slots 47 (see Fig. 1) in a panel plate 48 so as to permit rotation of the respective group restoration rods 42 and 43 by reason of the respective levers 45 and 46 being actuated to respective left and right positions to an extent limited by the length of the slots 47. Connection of the levers 45 and 46 to the respective rods 42 and 43 is accomplished by suitable cranks 49 which are secured to the respective rods 42 and 43, the cranks 49 being secured to the respective levers 45 and 46 by suitable pins 50.

With reference to Fig. 4, the rods 42 and 43 are spaced sufficiently in front of the trip plates 24 for the respective flight altitudes so that the rotation of the rods 90° from the normal positions of the rods as is illustrated in Fig. 8, does not cause interference with the operation of the trip plates 24, unless such trip plates are provided with detents 51 extending forward from the associated trip plates 24 so as to normally come substantially in contact with the rod 42 or 43 which is assumed to be rotated. It is thus provided that the actuation of each trip plate 24 by one of the rods 42 or 43 when rotated 90° from the normal position illustrated is dependent upon whether or not there is a detent 51 formed forwardly from that trip plate 24 so as to cause that trip plate to be actuated backwardly from the supporting plate S by the rotation of that rod 42 or 43.

In order that the trip plates 24 for the lower group of flight altitudes shall be actuated by the rotation of the rod 43, these trip plates 24 are provided with detents 51 which are located so as to cooperate with the rod 43. Similarly, detents 51 for the other trip plates 24 for the upper group of flight altitudes are formed opposite the rod 42 rather than the rod 43 so that the rotation of the rod 43 has no bearing upon the trip plates 24 for the upper group of flight altitudes, but the rotation of the rod 42 is effective to actuate each of the trip plates 24 for the upper group of the flight altitudes to their tripping positions.

Having thus considered the specific structure of one embodiment of the present invention, consideration will now be given as to the mode of operation of the flight progress board under typical operating conditions that may be encountered in practice.

It will first be considered that the trip mechanisms for the receptacles R for all flight altitudes are rendered effective by reason of the levers 45 and 46 both being in their left-hand positions as viewed in Fig. 1, so that the dropping down of each receptacle R is dependent upon the actuation of the right-hand push button for the associated flight altitude.

If the flight progress board is assumed to be operated by an approach controller governing the landing of airplanes at an airport, the general mode of operation may be that a plurality of airplanes awaiting an opportunity to land are retained in a holding stack at the fix for which the flight progress board is provided, each airplane being assigned to a separate flight altitude by being identified on the flight progress board by a flight progress strip of cardboard, or the like in the receptacle R for the corresponding flight altitude. If it is assumed that landings are made from the lowest flight altitude for which a receptacle R is provided on the flight progress board, each time an airplane is landed, the receptacle R for the lowest flight altitude is removed from the board and the right-hand push button PB is actuated for that flight altitude to extinguish a flight occupancy indicator lamp that has been illuminated for that flight altitude as is more particularly explained in the above mentioned application of N. B. Coley, filed of even date with the present application.

At such time as when the approach controller desires to ladder down an airplane at a second flight altitude to the vacant position at the first flight altitude. He first pushes the left-hand push button PB for the first flight altitude so as to obtain a clearance indication by the illumination of the lamp L above that button, and lock out other controllers who may have interlocked controls for the same fix on other boards (not shown) from issuing clearances for that same flight altitude. After obtaining clearance in this manner, the approach controller contacts the pilot of the airplane at the second flight altitude by his radio communication apparatus and instructs the pilot to descend to the first flight altitude. Upon receiving confirmation from the pilot that he has started his descent, the approach controller can then cancel the clearance that has been heretofore established for the second flight altitude by actuating the rigth-hand push button PB for that altitude on the panel P, and in accordance with the actuation of this push button PB, the clearance indicator lamp L which has been illuminated for that second flight altitude is extinguished according to the circuit organization provided by the above mentioned application of N. B. Coley, filed of even date with this application, and in addition to the extinguishing of that indicator lamp L, by reason of the plunger 29 (see Fig. 3) actuating the bracket 30 (see Fig. 3), the trip plate 24 for the second flight altitude is rotated in a counter-clockwise direction as viewed in Fig. 5 about its pivot point so as to withdraw the ends 36 of the trip pins 25 upon which the receptacle R for the second flight altitude has been resting.

The withdrawal of the trip pins 25 for the second flight altitude in this manner permits the receptacle R which has been associated with the second flight altitude to slide downwardly on the rods 12 to the next lower flight altitude. Thus it is provided that the cancellation of the clearance for the second flight altitude by actuation of the right-hand push button PB has been effective to extinguish the clearance lamp L for the second flight altitude and also cause the dropping of the receptacle R carrying the flight progress strip identifying the airplane which has occupied that flight altitude, so that this flight progress strip automatically becomes disposed at the position corresponding to the next lower flight altitude in accordance with the laddering down of the associated airplane flight.

In a similar manner, at such time as when the approach controller wishes to ladder down an airplane, which may be being held at the third flight altitude, to the vacated second flight altitude, he may accomplish this by a similar mode of operation, namely to first reserve the second flight altitude by actuation of the left-hand push button PB associated therewith, and, upon obtaining a clearance indication, to then contact the pilot of the airplane at the third flight altitude and instruct him to start his descent to the second flight altitude. When the pilot of this airplane at the third flight altitude informs the approach controller that he has started his descent, then the approach controller may proceed to cancel the reservation for the third flight altitude by actuation of the right-hand push button PB associated therewith, and the actuation of this button, in addition to cancelling the clearance indication for the third flight altitude, also actuates the trip plate 24 for that flight altitude so as to withdraw the trip pins 25 from beneath the flight progress strip receptacle R for that flight altitude, and thus cause this receptacle to drop to the position corresponding to the second flight altitude on the flight progress board as is illustrated as having been accomplished in Fig. 6. It comes to rest under these conditions upon the ends 36 of the trip pins 25 for the second flight altitude, because these trip pins have been automatically restored to their holding positions when pressure has been removed from the self-restoring push button PB which is assumed to have been actuated at a prior time for the second flight altitude and permitted to be restored by the time that cancellation is made for the third flight altitude.

Having thus described specifically the mode of operation in the laddering down of airplanes for specific typical flight altitudes, it will be readily apparent that the same mode of operation is applicable for the laddering down of airplanes for other flight altitudes, the right-hand push buttons PB for such flight altitudes being actuated to cancel the flight altitude reservations and drop the associated flight progress strip receptacles to the next lower flight altitude positions upon confirmation from the respective airplanes' pilots that the associated flight altitudes are being vacated.

The mode of operation that has been described for the laddering down of airplanes differs from the mode of operation heretofore employed in flight progress boards where no indicator lamp system is provided in that flight progress boards heretofore have not had any panel P associated therewith and thus the flight progress strip receptacles R have been permitted to drop freely in a section of the board corresponding to a fix upon removal of a lower receptacle. Thus by this arrangement, the removal of the receptacle for the lowest flight altitude would permit the receptacles for all other flight altitudes to be dropped simultaneously for one altitude spacing in that the receptacles are in such an arrangement, one stacked one above the other, that they all drop simultaneously by gravity upon the removal of a lower receptacle. In this way, obviously there is no definite indication apparent on the board as to what airplanes have been instructed to descend, other than what notations an approach controller may make on the flight progress strips. This method of laddering down of airplanes may be considered to be satisfactory in clear weather, when traffic is light, if it may be considered safe for the approach controller to rely more particularly upon his memory as to instructions that have been given airplanes for laddering down, rather than providing the facility of the panel having its indicators and buttons as a means for keeping indications posted on the flight progress board for the respective flight altitudes individually as for what flight altitudes laddering down instructions have been issued.

In order to render the flight progress board according to the present invention readily adapted to either system of laddering down operation, it is provided that the flight progress strip receptacles R can be rendered independent of the trip pins 25 so that the removal of the lowest receptacle R is effective to cause all other receptacles to drop simultaneously so that the flight progress board can be used in accordance with past practice under conditions where it is not considered necessary to use the control panel P as an added facility for keeping track of laddering down and flight altitude reservation procedures.

To render the receptacles R independent of the trip pins 25, the levers 45 and 46 at the top of panel P are actuated to their right-hand positions (see Fig. 1), and in accordance with the actuation of these levers, the vertical rods 42 and 43 are respectively rotated substantially 90°, and the rotation of these rods is effective to actuate the trip plates 24 for all flight altitudes backwardly from the front of the panel so as to withdraw the trip pins 25 to disengaging positions with respect to the receptacles R. With the levers 45 and 46 in these positions therefore there is no need for actuation of the right-hand push buttons PB on the panel P in order to permit the dropping of the receptacles R, but the receptacles are dropped in accordance with the removal of a receptacle for a lower flight altitude.

There may be conditions encountered in practice where it is desirable to use the buttons of the panel P for one group of flight altitudes but not for another group, and under these conditions selection is made as to the upper or lower group of flight altitudes having their receptacles R dependent upon the trip pins 25 in accordance with the actuation of the lever 45 or 46 belonging to such group to its left-hand position. Thus for example, if the lower group only of flight altitudes is desired to be indicated by use of the panel P, and thus the receptacles R for this group are to be dropped, dependent upon actuation of the cancellation push buttons PB, the lever 46 is actuated to its left-hand position and the lever 45 is actuated to its right-hand position. In accordance therewith the upper group of trip plates 24 which has detents 51 disposed opposite the rod 42 are actuated to retract their trip pins 25 from engagement beneath the receptacles R for the corresponding flight altitudes, and thus these receptacles R are permitted to drop simultaneously upon the removal of a lower receptacle. The dropping of the receptacles under these conditions is of course limited by the trip pins 25 for the highest altitude of the lower flight altitude group, so that the laddering down in the lower group does not effect the dropping of receptacles R for the higher group of flight altitudes which have their trip pins 25 retracted by reason of rotation of the rod 42.

It will also be readily apparent that the inverse of the above described conditions may be set up wherein the trip pins 25 are retracted by the rotation of the rod 43 upon actuation of the lever 46 to its right-hand position, while the lever 45 is maintained in its left-hand position, and the laddering down for the upper group only of flight altitudes provides for the dropping of the receptacles R of that group in response to the actuation of the cancellation buttons PB for the associated flight altitudes.

Because of the probable distance between the interlocked flight progress boards of respective airways and approach controller's offices, and because of the relatively large number of flight altitudes involved, the control of the indicator lights on the control panel P in accordance with the actuation of the respective push buttons PB involves a complex circuiting system of the code communication type such as is disclosed in the above mentioned applications of N. B. Coley. Inasmuch as the present invention more particularly relates to the structure of a flight progress board for use in an inter-facility system of the character disclosed in the above mentioned Coley applications, it is believed unnecessary to consider herein the specific circuits involved, but rather it is believed sufficient to consider a simplified control system that could be applied for a typical flight altitude where the respective interlocked flight progress boards are located close together.

Thus the circuits illustrated in Fig. 7 have been shown as typical of a control system that could be provided wherein the push button $PB^1$ is assumed to be a push button for use in the designation of reservations for a typical flight altitude, and the push button $PB^3$ is provided as a cancellation push button for the corresponding typical flight altitude. Associated with these push buttons $PB^1$ and $PB^3$ is a push button repeater relay PBS. This relay PBS when picked up closes its front contact 60 and establishes an obvious circuit for the energization of clearance lamp L for that flight altitude, the relay PBS being picked up in response to the actuation of the push button $PB^1$ for designating a reservation of the flight altitude under consideration. The depression of the push button $PB^1$, by closing contact 61 of that push button, provides a pick up circuit whereby the relay PBS is picked up, provided that there is no conflict in making the reservation, with a reservation which has been made by another flight progress board as indicated by the marks (XX) included in the control circuit for the relay PBS in series with the winding of that relay. The relay PBS when picked up is maintained steadily energized, subsequent to the restoration of the push button $PB^1$ to its normal position, by a stick circuit which is closed through the normally closed contact 62 of push button $PB^3$ and front contact 63 of the relay PBS. The symbols (+) and (—) as used in Fig. 7 are to indicate connections to the respective positive and negative terminals of a battery or other suitable source of direct current.

By this circuit arrangement, as shown in Fig. 7, the push button repeater relay PBS is maintained picked up, subsequent to having been energized in response to the designation of a reservation for the associated flight altitude, until the actuation of the cancellation push button $PB^3$ for that flight altitude. This push button $PB^3$, when actuated for cancellation, opens the stick circuit for the relay PBS at the normally closed contact 62, and by causing the dropping away of relay PBS, opens the circuit for the associated indicator lamp L at front contact 60 to provide for the extinguishing of the indicator lamp L on the panel P (see Fig. 1) for the associated flight altitude. The actuation of the cancellation button PB³ under these conditions is also effective as has been described for tripping the flight progress strip receptacle R (see Fig. 2) for the associated flight altitude by the actuation of the trip plate 24 for that flight altitude so as to withdraw the associated trip pins 25 and permit the receptacle R to be dropped to the next lower flight altitude position.

Having thus considered a simplified circuit means for extinguishing an indicator light for a particular flight altitude in response to the actuation of a push button PB which drops the receptacle R for the associated flight altitude to the next lower flight altitude position, it is to be understood that the circuit means for control of the indicator lamps L in response to the actuation of the respective push buttons PB is preferable to be provided in practice by a more complete circuit organization such, for example, as is disclosed in the above mentioned Coley applications in order to incorporate additional circuit control features desirable in a system of this kind, but considered as being unnecessary for an understanding of the present invention.

Having described a specific flight progress board as one embodiment of the present invention, it is desired to be understood that this form is used particularly to facilitate the disclosure of principles of the present invention which may be applied to structures involving modifications, adaptations, and alterations, with respect to the specific form shown to meet the requirements of practice, within the scope of the present invention as limited by the appending claims.

What I claim is:

1. A flight progress board for indicating the assignment of airplane flights to respective flight altitudes for a given fix comprising in combination, a supporting structure having laterally spaced slide rods secured thereto, flight progress strip receptacles slidable on said slide rods and disposed one above the other for the respective flight altitudes, push buttons for the respective flight altitudes, trip mechanisms associated with the respective flight progress strip receptacles and normally effective to support such receptacles, said trip mechanisms being divided into groups, and the trip mechanisms of each group having detents disposed at a position distinctive from the position of the detents of the other group, two laterally spaced trip cams extending vertically opposite said trip plates, said cams being effective when rotated to cooperate with the detents of one of the groups of trip plates to actuate those trip plates but not the trip plates of the other group, and the other of said cams being effective when rotated to cooperate with the detents of the other group of trip plates to actuate those trip plates but not the trip plates of said one group, and means for actuating each trip plate individually in response to the actuation of said push button for the associated flight altitude.

2. A flight progress board for indicating airplane flights assigned to respective flight altitudes comprising in combination for a particular fix, a control panel having an indicator lamp and a push botton for each flight altitude, the push buttons being disposed one above the other, circuit means for extinguishing said indicator lamp by the actuation of said push button for the associated flight altitude, a flight progress strip receptacle disposed opposite said push button for each flight altitude, a trip mechanism for each receptacle normally effective to support that receptacle, said trip mechanism being interlocked with the push button for the associated flight altitude so as to be actuated when that push button is actuated for the extinguishing of the associated indicator lamp, thus dropping that receptacle to the next lower flight altitude position, and manually operable means effective when actuated to actuate said trip mechanism simultaneously for a predetermined group of flight altitudes, irrespective of the actuation of the associated push buttons.

3. A flight progress board for indicating the assignment of airplane flights to respective flight altitudes comprising in combination, a supporting structure having laterally spaced slide rods secured thereto, flight progress strip receptacles disposed one above the other on said slide rods for respective assigned flight altitudes, a trip mechanism for each flight progress strip receptacle effective to normally support that receptacle, manually operable push buttons for the respective flight altitudes, each of the push buttons being effective when actuated to actuate said trip mechanism and thereby remove the support of the receptacle for the associated flight altitude only, and manually operable means effective when actuated to actuate the trip mechanism simultaneously for a plurality of flight altitudes and thus remove support of the associated receptacles without requiring actuation of the respective push buttons.

4. A flight progress board for indicating airplane flights assigned to respective flight altitudes at a particular fix comprising in combination, a case, a supporting plate and a panel disposed at one side thereof and secured in the top side of said case, vertical laterally spaced rods secured to said plate a push button having a circuit control contacts associated therewith disposed on said panel at a position comparable to each flight altitude, a flight progress strip receptacle for each flight altitude slidable by gravity on said slide rods, a trip plate for each flight altitude having a plurality of laterally spaced trip pins secured thereto and extending through said supporting plate and beneath said receptacle for the associated flight altitude, and means responsive to the actuation of said push button for any selected flight altitude for actuating said contacts associated with that button, said means being effective to actuate said trip plate for that flight altitude so as to withdraw said trip pins associated therewith and cause said receptacle for the associated flight altitude to drop substantially at the same time that said contacts are closed.

5. A flight progress board for indicating airplane flights assigned to respective flight altitudes comprising in combination, a supporting structure, a panel secured to said supporting structure having an indicator lamp and a push button disposed thereon for each of the flight altitudes, a trip plate for each flight altitude pivotally supported by said supporting structure, said trip plate having trip pins secured thereto, a flight progress strip receptacle for each flight altitude normally supported by said trip pins of the trip plate for the associated flight altitude, means coupling said trip plate and said push button for each flight altitude whereby the actuation of said push button for the associated flight altitude withdraws said trip pins from supporting said receptacle for the associated flight altitude so as to cause that receptacle to be dropped by gravity upon the actuation of the associated push button, and circuit means for distinctively conditioning said indicator lamp for each flight altitude upon the actuation of the associated push button.

6. A flight progress board for indicating airplane flights assigned to respective flight altitudes at a particular fix comprising in combination, a control panel having an indicator lamp and a push button for each flight altitude, the push buttons being disposed one above the other, circuit means for extinguishing said indicator lamp by the actuation of said push button for the associated flight altitude, a flight progress strip receptacle disposed to one side of said push button for each flight altitude, a trip mechanism for each flight altitude normally effective to support said receptacle for that flight altitude, said trip mechanism being interlocked with the push button for the associated flight altitude so as to be actuated when the push button is actuated for the extinguishing of the associated indicator lamp, whereby the receptacle is dropped for the associated flight altitude to the next lower position in response to the actuation of any selected push button for the extinguishing of the associated indicator lamp.

7. A flight progress board for indicating the reservation of flight altitudes of a fix for respective airplane flights comprising in combination, a supporting structure, a panel secured to said supporting structure, push buttons and indicators for the respective flight altitudes disposed on said panel, trip plates for the respective flight altitudes disposed on the board one above the other, each of said trip plates having an edge pivoted by engagement with said supporting structure, and each of said trip plates having a trip pin secured thereto, slidable flight progress strip receptacles for the respective flight altitudes disposed one above the other in front of the respective trip plates so as to rest on the trip pins of the associated plates, spring biasing means normally maintaining the trip plates in position to support their associated receptacles, and means for actuating each of said trip plates so as to drop the associated receptacle to the next lower flight altitude position in response to the actuation of said push button for the associated flight altitude.

8. In a flight progress board for indicating airplane flights assigned to respective flight altitudes, a supporting structure, a rectangular trip plate pivoted at its respective ends along one edge by engagement with said supporting structure, said trip plate being spring biased about its pivot point in a particular direction, a plurality of trip pins actuated by the actuation of said trip plate, a flight progress strip receptacle normally supported by said trip pins, and manually operable means for actuating said trip plate about its pivot point to an extent to withdraw said trip pins against the spring bias of the trip plate from support of said flight progress strip receptacle.

RALPH W. HEWES.

No references cited.